(12) United States Patent
Nakajima et al.

(10) Patent No.: US 7,346,409 B2
(45) Date of Patent: Mar. 18, 2008

(54) INFORMATION PROCESSING APPARATUS, AND INFORMATION PROCESSING METHOD

(75) Inventors: Yasuaki Nakajima, Kyoto (JP); Mayuko Kishimoto, Kyoto (JP); Akira Matsushita, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 75 days.

(21) Appl. No.: 11/441,401

(22) Filed: May 26, 2006

(65) Prior Publication Data

US 2007/0005853 A1    Jan. 4, 2007

(30) Foreign Application Priority Data

May 30, 2005    (JP)    ............... P2005-157987

(51) Int. Cl.
*G06F 19/00*    (2006.01)

(52) U.S. Cl. ............... 700/108; 700/109; 700/110; 382/141

(58) Field of Classification Search ............... 700/100, 700/108, 109; 706/45–47, 52, 60, 900, 911, 706/912; 714/1, 2, 21, 25–27, 47–50, 100
See application file for complete search history.

(56) References Cited

U.S. PATENT DOCUMENTS

| | | | | |
|---|---|---|---|---|
| 5,166,934 | A * | 11/1992 | Tomiyama et al. | ............ 714/26 |
| 5,392,359 | A * | 2/1995 | Futamura et al. | ............ 382/141 |
| 5,434,955 | A * | 7/1995 | Kumamoto | ............ 706/52 |
| 5,501,538 | A * | 3/1996 | Sawada et al. | ............ 400/304 |
| 6,014,453 | A * | 1/2000 | Sonoda et al. | ............ 382/137 |
| 6,259,960 | B1 * | 7/2001 | Inokuchi | ............ 700/110 |
| 2005/0010445 | A1 * | 1/2005 | Krishnan et al. | ............ 705/2 |

FOREIGN PATENT DOCUMENTS

| | | |
|---|---|---|
| EP | 0 529 130 | 3/1993 |
| EP | 1 236 986 | 9/2002 |
| JP | 07-271599 | 10/1995 |
| JP | 10-055277 | 2/1998 |

OTHER PUBLICATIONS

"Automated Optical Inspection Solutions," Agilent Technologies, Online, Apr. 3, 2003, 12 Sheets, http://www.home.agilent.com/upload/cmc_upload/All/59889239en_073003.pdf>.

(Continued)

*Primary Examiner*—Leo Picard
*Assistant Examiner*—Carlos Ortiz-Rodriguez
(74) *Attorney, Agent, or Firm*—Foley & Lardner LLP

(57) ABSTRACT

There is provided an information processing apparatus that allows a user to understand what kinds of causes are accumulated stepwise in what kind of order to cause abnormality and due to what kinds of reasons respective causes occur from direct causes of the respective causes. The information processing apparatus includes: an inference unit that infers, when abnormality occurs in a product manufactured by manufacturing equipment and the abnormality is caused by stepwise accumulation of plural causes, a fundamental cause of the abnormality by specifying the causes stepwise and, at least at certain one stage, selectively specifying one cause out of two or more direct causes that cause a cause at the stage using at least inference data stored in advance; a reason acquiring unit that acquires, for each of the causes specified stepwise, data concerning reasons why the cause occurs from a storage device; and a display control unit that causes a display unit to display, for each of the reasons, the data concerning the respective reasons in association with related causes concerning the respective reasons.

13 Claims, 7 Drawing Sheets

OTHER PUBLICATIONS

"Boundary-Scan Test and In-System Programming Software," Coelis, Online, Mar. 6, 2005, 12 Sheets, www.corelis.com/products/Test_Software.htm>.

Kitamura et al., "Fault Diagnosis Based on Ontological Consideration of Faults—Exhaustive Fault Hypotheses Generation." Journal of Japanese Society for Artificial Intelligence, Technical Papers, vol. 14, No. 5, 1999, pp. 838-848.

* cited by examiner

FIG. 4

| REASON DATA ID | RELEVANCE DATA ID | REASON EXPLANATION INFORMATION | REASON IMAGE ADDRESS INFORMATION | RELATED APPARATUS INFORMATION | RELATED INSPECTION INFORMATION |
|---|---|---|---|---|---|
| 001 | A1 | ...... | C:... IMAGE 1.JPEG | ...... | ...... |
| 002 | A2 | ...... | C:... IMAGE 2.JPEG | ...... | ...... |
| 003 | A3 | ...... | C:... IMAGE 3.JPEG | ...... | ...... |
| 004 | A4 | ...... | C:... IMAGE 4.JPEG | ...... | ...... |
| ...... | ...... | ...... | ...... | ...... | ...... |
| ...... | Ai | PRINTING HEIGHT IS | C:... IMAGE i.JPEG | INDENTATION AMOUNT OF MASK | P: PRINTING AREA |
| ...... | Ai + 1 | INDENTATION OF MASK IS | C:... IMAGE i + 1.JPEG | SUBSTRATE THICKNESS SETTING | P: PRINTING AREA |
| ...... | Ai + 2 | SUBSTRATE THICKNESS SETTING IS | C:... IMAGE i + 2.JPEG | SUBSTRATE THICKNESS SETTING | P: PRINTING AREA |
| ...... | Ai + 3 | ...... | C:... IMAGE i + 3.JPEG | COMPONENT MOUNTING RATIO | S: COMPONENT DEVIATION |
| ...... | Ai + 4 | ...... | C:... IMAGE i + 4.JPEG | MASK RECOGNITION RATIO | P: PRINTING AREA |
| ...... | Ai + 5 | ...... | C:... IMAGE i + 5.JPEG | COMPONENT RECOGNITION RATIO | S: COMPONENT DEVIATION |
| ...... | ...... | ...... | ...... | ...... | ...... |
| ...... | An | ...... | ...... | ...... | ...... |
| ...... | ...... | ...... | ...... | ...... | ...... |

FIG. 7

INFORMATION PROCESSING APPARATUS, AND INFORMATION PROCESSING METHOD

This application claims priority from Japanese patent applications JP P2005-157987, filed on May 30, 2005. The entire content of the aforementioned application is incorporated herein by reference.

BACKGROUND OF THE INVENTION

1. Field of the Invention

The present invention relates to an information processing apparatus, an information processing method, a program, and a computer readable recording medium having the program recorded therein for inferring a fundamental cause of abnormality.

2. Description of the Related Art

Conventionally, there is known an apparatus that infers a fundamental cause of abnormality (deficiency) such as a failure of manufacturing equipment using a so-called expert system. Even a user with a poor ability for inferring a fundamental cause is capable of quickly and accurately resetting equipment to a normal state by using such an apparatus.

However, with such an apparatus, the inferred fundamental cause is only notified to the user. The user cannot understand due to what kinds of reasons (through what kind of mechanism) the abnormality has occurred from the fundamental cause. In other words, the user cannot logically understand a reason that logically links the abnormality and the fundamental cause.

For example, Japanese Patent No. 3455276 (laid open Oct. 20, 1995) discloses a failure diagnosis apparatus that displays, when a fundamental cause can be inferred, an inference result (i.e., a search object indicating for which component or in which place inference is performed), an inspection result, and a cause of a phenomenon observed by the inspection to notify a user working as a service person of the inference result, the inspection result, and the cause of the phenomenon. The user is allowed to logically understand a link between a deficiency phenomenon and the inference result by using this failure diagnosis apparatus.

The abnormality is usually caused by stepwise accumulation of plural causes. In other words, for example, when it is assumed that a direct cause of the abnormality is a cause A, a phenomenon of the cause A is caused by a cause B that is a direct cause of the phenomenon and a phenomenon of the cause B is caused by a cause C (a fundamental cause) that is a direct cause of the phenomenon.

In a usual process of inference, a fundamental cause is inferred by selecting, at least at certain one stage, one cause out of two or more causes that cause a cause (a phenomenon) at the stage.

However, in the failure diagnosis apparatus disclosed in Japanese Patent No. 3455276, although the search object and the cause of the phenomenon observed in the inspection are displayed, it is not indicated what kinds of causes are accumulated stepwise in what kind of order to cause the abnormality. Moreover, a causal relation between a cause at a certain stage (hereinafter "high order cause") and a direct cause of the cause (phenomenon) (hereinafter "low order cause") (i.e., a reason why the high order cause occurs from the low order cause) is not displayed.

Therefore, with the conventional failure diagnosis apparatus, the user cannot understand what kinds of causes are accumulated stepwise in what kind of order to cause abnormality and due to what kinds of reasons the respective causes occur from direct causes of the respective causes.

SUMMARY OF THE INVENTION

The invention has been devised in view of the problems described above and it is an object of the invention to provide an information processing apparatus, an information processing method, a program, and a computer readable recording medium having the program recorded therein with which a user is capable of understanding what kinds of causes are accumulated stepwise in what kind of order to cause abnormality and due to what kinds of reasons the respective causes occur from direct causes of the respective causes.

In order to solve the problems, an information processing apparatus according an aspect of the invention includes: inferring means for inferring, when abnormality occurs in a product manufactured by manufacturing equipment and the abnormality is caused by stepwise accumulation of plural causes, a fundamental cause of the abnormality by specifying the causes stepwise and, at least at certain one stage, selectively specifying one cause out of two or more direct causes that cause a cause at the stage using at least inference data stored in advance; reason data acquiring means for acquiring, assuming that n is a natural number equal to or larger than 2, i is an arbitrary natural number equal to or larger than 1 and equal to or smaller than n−1, the causes specified stepwise leading from the direct cause of the abnormality to the inferred fundamental cause are a first cause, a second cause, . . . , and an nth cause, a reason why the abnormality occurs from the first cause is a first reason and a reason why the ith cause occurs from the i+1th cause is an i+1th reason, data indicating, for each of certain causes at a certain stage, reasons why the certain causes occur from direct causes that cause the causes is reason data, the first cause and the abnormality are related causes concerning the first reason, and the i+1th cause and the ith cause are related causes concerning the i+1th reason, when the inferring means infers the fundamental cause, data concerning the first reason to the nth reason in the reason data from a storage device having the reason data stored therein; and display control means for causing a display device to display, for each of the reasons, the data concerning the first reason to the nth reason acquired in association with the related causes concerning the respective reasons.

According to this aspect of the invention, when abnormality occurs in a product manufactured by manufacturing equipment and the abnormality is caused by stepwise accumulation of plural causes, it is possible to infer a fundamental cause of the abnormality by specifying, with the inferring means, the causes stepwise and, at least at certain one stage, selectively specifying one cause out of two or more direct causes that cause a cause at the stage using at least inference data stored in advance.

When the inferring means infers the fundamental cause, it is possible to acquire, with the reason data acquiring means, the data concerning the first reason to the nth reason in the reason data from the storage device having the reason data stored therein.

In other words, it is possible to acquire, from the reason data, concerning the respective causes (including the fundamental cause) specified by the inferring means leading from the abnormality to the fundamental cause, with the reason data acquiring means, data indicating a reason why a cause at a stage close to the abnormality from this cause by one stage of the cause occurs. In addition, it is possible to acquire, from the reason data, with the reason data acquiring means, data indicating a reason why the abnormality occurs from a direct cause of the abnormality, which is the cause specified.

Moreover, it is possible to cause, with the display control means, the display device to display, for each of the reasons, the data concerning the first reason to the nth reason acquired in association with the related causes concerning the respective reasons.

In other words, it is possible to cause, concerning the respective causes specified by the inferring means, with the display control means, the display device to display, for each of the reasons, the data indicating a reason why a cause at a stage close to the abnormality from this cause by one stage of the cause occurs and the data indicating a reason why the abnormality occurs from a direct cause of the abnormality, which is the cause specified, in association with the related causes concerning the respective reasons.

This makes it possible for the user to grasp, concerning the respective causes specified in the process of inference by the inferring means, a reason why a cause at a stage close to the abnormality from this cause by one stage of the cause and a reason why the abnormality occurs from a direct cause of the abnormality, which is the cause specified, together with the related causes concerning the respective reasons by checking content of display on the display device.

Accordingly, the user can grasp what kinds of causes are accumulated stepwise to cause the abnormality and a causal relation between a certain cause at a certain stage and a direct cause of the cause (i.e., a reason why a certain cause (including abnormality) at a certain stage occurs from the direct cause).

Therefore, there is an advantage that it is possible to provide an information processing apparatus that allows the user to understand what kinds of causes are accumulated stepwise in what kind of order to cause abnormality and due to what kinds of reasons respective causes occur from direct causes of the respective causes.

The product may be an intermediate product that is manufactured in an intermediate process of a manufacturing line.

In another aspect of the invention, in the information processing apparatus, assuming that the data concerning the first reason to the nth reason acquired are first data, second data, . . . , and nth data, respectively, the display control means causes the display device to display the data concerning the first reason to the nth reason in an order of the nth data, the n−1th data, . . . , and the first data.

According to this aspect of the invention, the display control means causes the display device to display the data concerning the first reason to the nth reason in an order of the nth data, the n−1th data, . . . , and the first data. This makes it possible for the user to check the reasons in the order of the nth reason, the n−1th reason, . . . , and the first reason on the display device.

Accordingly, the user can grasp the respective reasons in an order leading from the fundamental cause to the abnormality.

Therefore, there is an advantage that the user can understand the reasons in a course in which the abnormality occurs from the fundamental cause in accordance with the course.

In a still another aspect of the invention, in the information processing apparatus, assuming that image data for explaining the respective reasons with images are reason explanation image data, respectively, the respective reason explanation image data are stored in the storage device as the reason data. The display control means causes, in displaying the data concerning the first reason to the nth reason acquired, the display device to display the reason explanation image data corresponding to the respective reasons.

According to this aspect of the invention, in displaying the data concerning the first reason to the nth reason acquired, it is possible to cause, with the display control means, the display device to display the reason explanation image data corresponding to the respective reasons.

Accordingly, the user can check the respective reasons together with the images.

Therefore, there is an advantage that the user can easily understand the reasons in a course in which the abnormality occurs from the fundamental cause compared with the case without images.

In still another aspect of the invention, the information processing apparatus further includes inspection result data acquiring means for acquiring at least inspection result data indicating the respective causes, the first cause to the nth cause, from an inspection apparatus that inspects a quality of the product. The display control means causes the display device to display, in displaying data concerning the i+1th reason, inspection result data indicating the ith cause and, in displaying data concerning the first reason, inspection result data indicating the abnormality.

According to this aspect of the invention, it is possible to acquire, with the inspection result data acquiring means, at least inspection result data indicating the respective causes, the first cause to the nth cause, from the inspection apparatus that inspects a quality of the product.

When the display control means causes the display device to display the data concerning the i+1th reason, the display control means causes the display device to display the inspection result data indicating the ith cause. Accordingly, in causing the display device to display the data concerning the i+1th reason, it is possible to cause the display device to display the inspection result data indicating the ith cause that is a cause caused by the i+1th reason.

When the display control means causes the display device to display the data concerning the first reason, the display control means causes the display device to display the inspection result data indicating the abnormality. Accordingly, in causing the display device to display the data concerning the first reason, it is possible to cause the display device to display the inspection result data indicating the abnormality that is a cause caused by the i+1th reason.

Therefore, there is an advantage that the user can check, concerning the respective reasons, data indicating causes (including the abnormality) that support the reasons and are caused by the reasons.

In still another aspect of the invention, in the information processing apparatus, the inspection result data acquiring means further acquires, as the inspection result data, inspection point state image data that is photographed by a photographing device and indicates a state of an inspection point in the inspection at the time when the inspection result data is acquired. The display control means causes the display device to display, in displaying data concerning the i+1th reason, inspection point state image data indicating the ith cause and, in displaying data concerning the first reason, inspection point state image data indicating the abnormality.

According to this aspect of the invention, it is possible to acquire, with the inspection result data acquiring means, as the inspection result data, inspection point state image data that is photographed by a photographing device and indicates a state of an inspection point in the inspection at the time when the inspection result data is acquired.

When the display control means causes the display device to display the data concerning the i+1th reason, the display control means causes the display device to display the inspection point state image data indicating the ith cause. Accordingly, in causing the display device to display the data concerning the i+1th reason, it is possible to cause the display device to display the inspection point state image data indicating the ith cause, which is a cause caused by the i+1th reason, as an actual inspection image.

When the display control means causes the display device to display the data concerning the first reason, the display control means causes the display device to display the inspection point state image data indicating the abnormality. Accordingly, in causing the display device to display the data concerning the first reason, it is possible to cause the display device to display the inspection point state image data indicating the abnormality, which is a cause caused by the first reason, as an actual inspection image.

Therefore, there is an advantage that the user can check, concerning the respective reasons, data indicating causes (including the abnormality), which support the reasons and are caused by the reasons, as an image.

In still another aspect of the invention, the information processing apparatus further includes state data acquiring means for acquiring, assuming that components constituting the manufacturing equipment and affecting a quality of a product manufactured by the manufacturing equipment are equipment components and data indicating setting values of the respective equipment components and/or results of processing applied to the product by the equipment components is state data, the state data from the manufacturing equipment. The display control means causes the display device to display, in displaying data concerning the i+1th reason, state data of the equipment components related to the i+1th reason and, in displaying data concerning the first reason, state data of the equipment components related to the first reason.

According to this aspect of the invention, it is possible to acquire, with the state data acquiring means, setting values of the respective equipment components and/or state data indicating results of processing applied to the product by the equipment components.

When the display control means causes the display device to display the data concerning the i+1th reason, the display control means causes the display device to display state data of the equipment components related to the i+1th reason. Moreover, when the display control means causes the display device to display the data concerning the first reason, the display control means causes the display device to display the state data of the equipment components related to the first reason.

Accordingly, the user can check, for each of the reasons, state data of equipment components related to the respective reasons.

Therefore, there is an advantage that the user can check, concerning the respective reasons, actual setting values of the equipment components and/or the processing result that support the reasons.

In order to solve the problems, an information processing method according a still another aspect of the invention includes: an inferring step of inferring, with inferring means, when abnormality occurs in a product manufactured by manufacturing equipment and the abnormality is caused by stepwise accumulation of plural causes, a fundamental cause of the abnormality by specifying the causes stepwise and, at least at certain one stage, selectively specifying one cause out of two or more direct causes that cause a cause at the stage using at least inference data stored in advance; an acquiring step of acquiring, with reason data acquiring means, assuming that n is a natural number equal to or larger than 2, i is an arbitrary natural number equal to or larger than 1 and equal to or smaller than n−1, the causes specified stepwise leading from the direct cause of the abnormality to the inferred fundamental cause are a first cause, a second cause, . . . , and an nth cause, a reason why the abnormality occurs from the first cause is a first reason and a reason why the ith cause occurs from the i+1th cause is an i+1th reason, data indicating, for each of certain causes at a certain stage, reasons why the certain causes occur from direct causes that cause the causes is reason data, the first cause and the abnormality are related causes concerning the first reason, and the i+1th cause and the ith cause are related causes concerning the i+1th reason, when the inferring means infers the fundamental cause, data concerning the first reason to the nth reason in the reason data from a storage device having the reason data stored therein; and a display step of causing, with display control means, a display device to display, for each of the reasons, the data concerning the first reason to the nth reason acquired in association with the related causes concerning the respective reasons.

In the information processing method, as in the information processing apparatus, there is an advantage that a user is capable of understanding what kinds of causes are accumulated stepwise in what kind of order to cause abnormality and due to what kinds of reasons respective causes occur from direct causes of the respective causes.

In order to solve the problems, a program according to still another aspect of the invention is a program for causing a computer to function as the respective means of the information processing apparatus.

Therefore, there is an advantage that it is possible to provide a user with the information processing apparatus by loading the program to a computer system.

In order to solve the problems, a recording medium according to still another aspect of the invention is a computer readable recording medium having the program recorded therein.

Therefore, there is an advantage that it is possible to provide a user with the information processing apparatus by loading the program recorded in the recording medium to a computer system.

BRIEF DESCRIPTION OF THE DRAWINGS

In the accompanying drawings:

FIG. 4 is a diagram showing reason data used by the information processing apparatus in displaying a reason for inference;

FIG. 7 is a diagram showing an example of display of reason data on a display unit of the information processing apparatus.

DETAILED DESCRIPTION OF THE INVENTION

An embodiment of the invention will be hereinafter explained with reference to the accompanying drawings.

Figure 2:
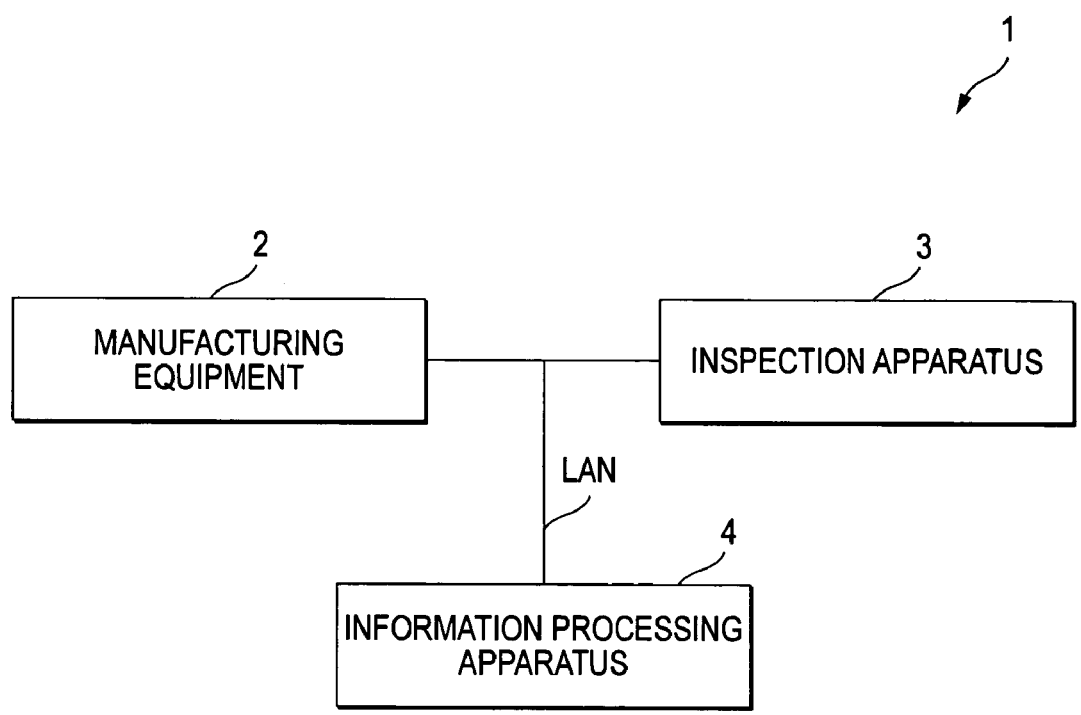
FIG. 2 is a diagram showing a constitution of a system including the information processing apparatus according to the embodiment of the invention.

As shown in FIG. 2, a system 1 according to this embodiment includes manufacturing equipment 2, an inspection apparatus 3, and an information processing apparatus 4.

The manufacturing equipment 2 sequentially manufactures predetermined products (e.g., circuit boards) When it is assumed that components that constitute the manufacturing equipment 2 and affect a quality of products manufactured by the manufacturing equipment 2 are equipment components, when a predetermined instruction (hereinafter, first instruction) is received from the information processing apparatus 4, the manufacturing equipment 2 sends data concerning states of the equipment components (hereinafter, state data) to the information processing apparatus 4. The state data indicates numerical value data of setting values of the equipment components and results of processing applied to the products by the equipment components (measurement values, etc.).

The inspection apparatus 3 inspects a quality of products manufactured by the manufacturing equipment 2. Moreover, when it is judged that abnormality occurs in the products manufactured by the manufacturing equipment 2, the inspection apparatus 3 displays an indication indicating that the abnormality occurs on a display unit (not shown).

When a predetermined instruction (hereinafter, second instruction) is received from the information processing apparatus 4, the inspection apparatus 3 sends inspection result data indicating results of inspections and reference value data indicating a reference value serving as a reference of judgment for acceptance of products in the respective inspections to the information processing apparatus 4. Moreover, the inspection apparatus 3 includes a photographing device (not shown) that photographs states of inspection points in the respective inspections.

The manufacturing equipment 2, the inspection apparatus 3, and the information processing 4 are connected to one another by, for example, a LAN.

Figure 1:
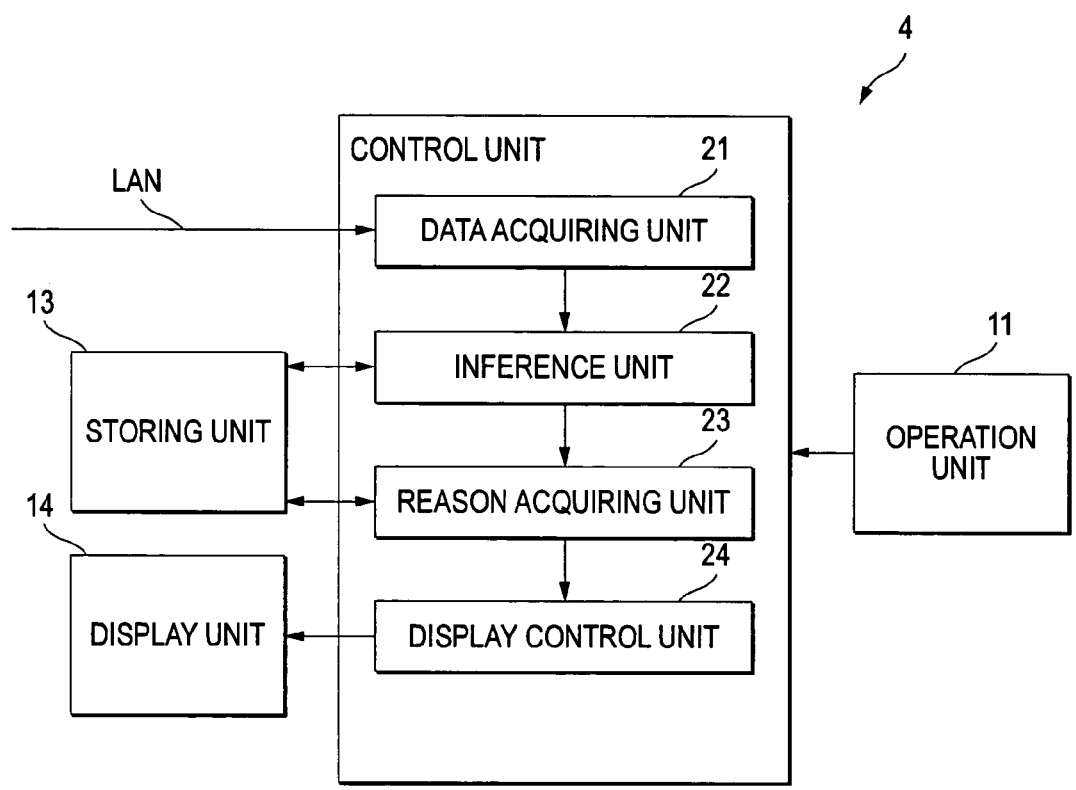
FIG. 1 is a block diagram showing a schematic constitution of an information processing apparatus according to an embodiment of the invention.

As shown in FIG. 1, the information processing apparatus 4 includes an operation unit 11, a control unit 12, a storing unit (a storage device) 13, and a display unit (a display device) 14. The control unit 12 includes a data acquiring unit (inspection result data acquiring means/state data acquiring means) 21, an inference unit (inferring means) 22, a reason acquiring unit (reason data acquiring means) 23, and a display control unit (display control means) 24.

The operation unit 11 receives various instructions from a user and sends the instructions received to the control unit 12. For example, when the user recognizes from an inspection result of the inspection apparatus 3 that abnormality occurs in products manufactured by the manufacturing equipment 2, the operation unit 11 receives an instruction for inferring a fundamental cause of the abnormality from the user.

As described in detail later, inference data and reason data are stored in the storing unit 13. It is possible to constitute the storing unit 13 using, for example, a RAM or an HDD.

The display unit 14 displays a predetermined image on the basis of display control by the display control unit 24. Content of the image displayed on the display unit 14 will be described later. It is possible to constitute the display unit 14 using, for example, a liquid crystal display device including a liquid crystal driving device and a liquid crystal display panel, or a Cathode Ray Tube (CRT).

The control unit 12 and respective units 21 to 24 of the control unit 12 will be explained.

The control unit 12 receives the instructions from the user via the operation unit 11. When the control unit 12 receives an instruction for inferring the fundamental cause (an inference instruction), the data acquiring unit 21 sends the first instruction to the manufacturing equipment 2 and sends the second instruction to the inspection apparatus 3. Consequently, the data acquiring unit 21 acquires the state data from the manufacturing equipment 2 and acquires the inspection result data and the reference value data from the inspection apparatus 3. Moreover, the data acquiring unit 21 acquires image data that is photographed by the photographing device of the inspection apparatus 3 and indicates a state of an inspection point in an inspection at the time when the inspection result data is acquired (hereinafter, inspection point state image data) from the inspection apparatus 3. The data acquiring unit 21 sends the respective data acquired to the inference unit 22. The state data, the inspection result data, and the image data are data related to a product that is judged as abnormal by the inspection apparatus 3.

The inference unit 22 receives the state data, the inspection result data, the reference value data, and the inspection point state image data from the data acquiring unit 21. The inference unit 22 infers a fundamental cause of the abnormality on the basis of these data and the inference data stored in the storing unit 13. The state data, the inspection result data, the reference value data, and the inspection point state image data are stored in the storing unit 13 by the inference unit 22.

In the following explanation, after explaining the inference data, a specific method of inferring a fundamental cause will be explained. The reason data will also be explained. In the following explanation, the abnormality is caused by stepwise accumulation of plural causes and, at least at certain one stage, there are two or more causes that cause a cause in the stage.

The inference data will be explained.

The inference data has data indicating phenomenon data representing respective phenomena and relevance between a certain phenomenon and a phenomenon directly causing the phenomenon in association with at least phenomenon data of the certain phenomenon for each of the phenomenon data (hereinafter, relevance data). Moreover, in the inference data, when there are plural direct causes of the certain phenomenon, conditional expression data indicating a predetermined conditional expression is associated with each of the phenomenon data indicating the certain phenomenon. This conditional expression data is data used for specifying one direct cause of the certain phenomenon. The inference data has an ID for each of the relevance data (hereinafter, relevance data ID). Moreover, in the inference data, concerning the phenomenon data associated with the conditional expression data, the conditional expression data and the relevance data ID are associated with each of the phenomenon data.

Figure 3:
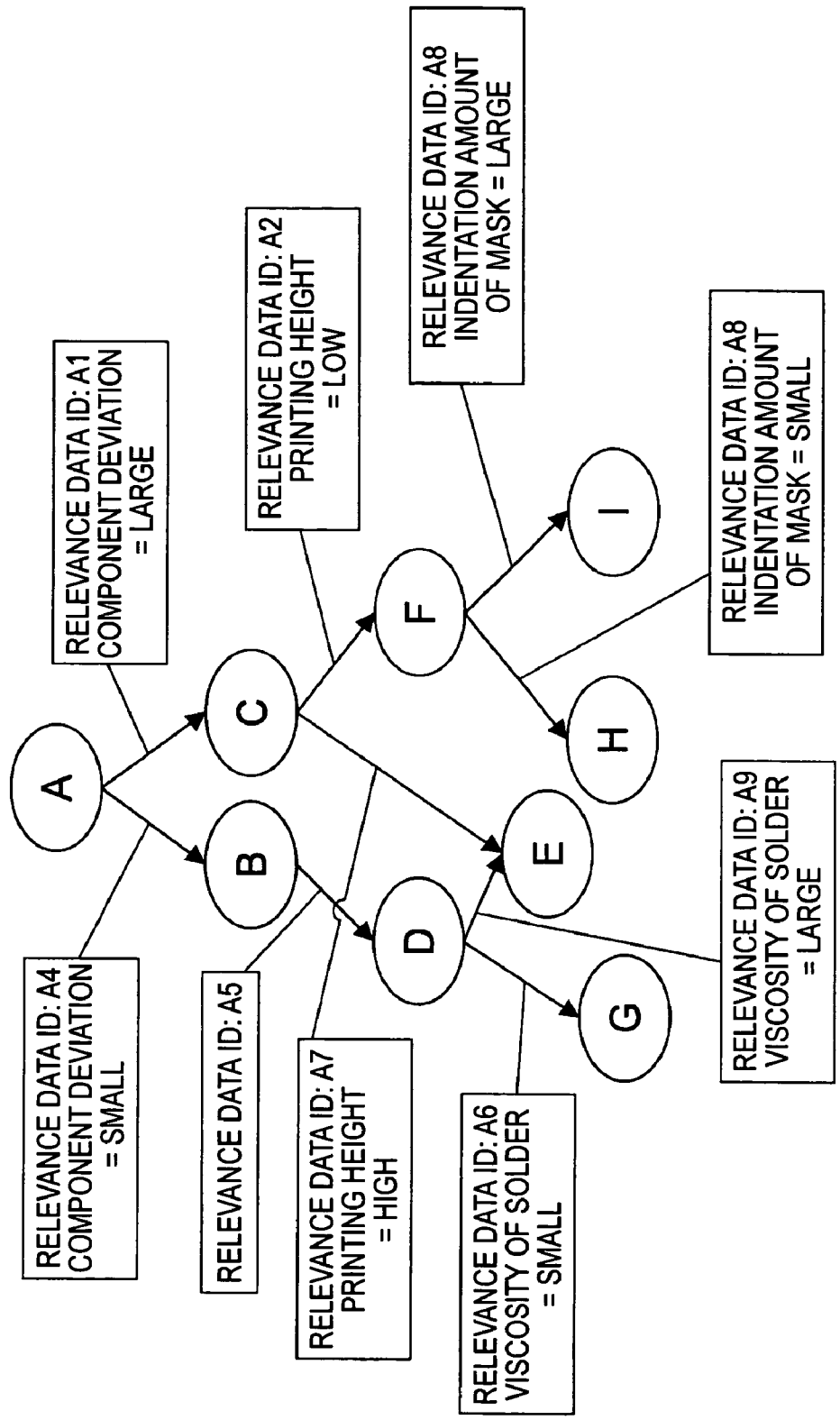
FIG. 3 is a diagram conceptually showing inference data used by the information processing apparatus in performing inference.

Such inference data is represented as a conceptual structure, for example, as shown in FIG. 3. A to I in the figure are equivalent to the phenomena described above. Arrows are equivalent to the relevance data. In the figure, for example, when it is assumed that the certain phenomenon is A, phenomena directly causing the certain phenomenon A are B and C.

In this case, on the basis of data indicating whether component deviation is "small" or "large", when component deviation is "small", the conditional expression data is data for specifying the phenomenon B that is one of two direct causes specified by the relevance data. When component deviation is "large", the conditional expression data is data for specifying the phenomenon C that is the other cause. As shown in the figure, A1 to A9 are associated with each of the relevance data as the relevance data ID.

When the phenomenon A in FIG. 3 is abnormality (an abnormal phenomenon) of the product, the phenomenon B or the phenomenon C is conceivable as a direct cause of the phenomenon A. The phenomenon D is conceivable as a direct cause of the phenomenon B. The phenomenon E or the phenomenon F is conceivable as a direct cause of the phenomenon C. The phenomenon E or the phenomenon G is conceivable as a direct cause of the phenomenon D. The phenomenon H or the phenomenon I is conceivable as a direct cause of the phenomenon F.

In the figure, the respective phenomena E, G, H, and I do not have relevance data having relevance with phenomena directly causing the respective phenomena (i.e., arrows starting from E, G, H, and I are not present). This means that direct causes of the respective phenomena are not present.

In the figure, any one of the phenomena E, G, H, and I is a fundamental cause of the phenomenon (abnormality) A. In other words, the four phenomena E, G, H, and I are candidates of a fundamental cause of the phenomenon A and one of the phenomena is the fundamental cause.

As shown in the figure, on the basis of data indicating whether a printing height of solder is "high" or "low", when a printing height is "high", a conditional expression data associated with the phenomenon C is data for specifying the phenomenon E that is one of two direct causes specified by the relevance data. When a printing height is "low", the conditional expression data is data for specifying the phenomenon F that is the other cause.

On the basis of data indicating whether viscosity of solder is "large" or "small", when viscosity is "large", a conditional expression data associated with the phenomenon D is data for specifying the phenomenon E that is one of two direct causes specified by the relevance data. When viscosity is "small", the conditional expression data is data for specifying the phenomenon G that is the other cause.

On the basis of data indicating whether an indentation amount of a mask used for solder printing is "small" or "large", when an indentation amount is "small", a conditional expression data associated with the phenomenon F is data for specifying the phenomenon H that is one of two direct causes specified by the relevance data. When an indentation amount is "large", the conditional expression data is data for specifying the phenomenon I that is the other cause.

In the following explanation, respective pieces of information used for specifying phenomena directly causing the phenomena such as information indicating whether component deviation is "small" or "large", a printing height of solder is "high" or "low", viscosity of solder is "large" or "small", and an indentation amount of a mask is "small" or "large" are referred to as specifying data. The specifying data is also data forming the conditional expression data.

Since the specifying data is data for specifying a phenomenon directly causing the certain phenomenon, as long as identical specifying data is not present in the inference data, it is possible to specify the certain phenomenon and the phenomenon directly causing the certain phenomenon as one phenomenon, respectively, from the specifying data. For example, it is possible to specify the certain phenomenon as C and specify the phenomenon directly causing the certain phenomenon as F from the specifying data "printing height is low". As described in detail later, phenomena are specified in this way by the inference unit 22.

The reason data will be explained.

For example, as shown in FIG. 4, the reason data is data in which the relevance data ID, reason explanation information, reason image address information, related equipment component information, and related inspection information are associated with each of reason data IDs.

When a certain phenomenon is referred to as a high order phenomenon and a phenomenon directly causing the certain phenomenon (the high order phenomenon) is referred to as a low order phenomenon, the reason explanation information is data indicating, with characters, a reason why the high order phenomenon occurs from the low order phenomenon in two phenomena (i.e., the high order phenomenon and the low order phenomenon) specified by a relevance data ID associated with the reason explanation information.

In other words, in a state indicated by the specifying data used for specifying the low order phenomenon (e.g., C) from the high order phenomenon (e.g., A) (i.e., the data indicating that component deviation is "large"), the reason explanation information is data indicating, with characters, "why the high order phenomenon A occurs from the low order phenomenon C (i.e., an occurrence reason).

The reason image address information is data designating an address in the storing unit 13 in which image data for facilitating understanding of content indicated by reason explanation (hereinafter, reason explanation image data).

The related equipment component information is data indicating information on equipment components related to the reason explanation information. Examples of the related equipment component information include, as shown in FIG. 4, item information such as a "mask indentation amount", "substrate thickness setting of a printing machine", a "component mounting ratio", a "mask recognition ratio", and a "component recognition ratio". Actual numerical value data of an indentation amount concerning, for example, the "mask indentation amount" is not included in the related equipment component information. In the following explanation, the respective items such as the "mask indentation amount" are referred to as items of the related equipment component information.

The related inspection information is data indicating inspection items in the inspection apparatus 3 related to the reason explanation information. The related inspection information is, for example, as shown in the figure, data indicating items such as a "printing area" and "component deviation".

A specific inference method for a fundamental cause will be explained.

First, the inference unit 22 creates specifying data that can be obtained from the inspection result data and the reference value data among the specifying data described above on the basis of the inspection result data and the reference value data described above. For example, the inference unit 22 creates specifying data such as "component deviation is large", "component deviation is small", "a printing height is high", and "a printing height is low".

The inference unit 22 creates, on the basis of the state data described above, specifying data that can be obtained from the state data among the specifying data described above. For example, the inference unit 22 creates specifying data such as "a mask indentation amount is large", "a mask indentation amount is small", "solder viscosity is small", and "solder viscosity is large". When the manufacturing equipment 2 creates information indicating whether a mask indentation amount is large compared with a reference value and creates information indicating viscosity of solder from remaining solder on the mask, it is possible to obtain such specifying data in the information processing apparatus 4.

Moreover, the inference unit 22 infers a fundamental cause of abnormality using the specifying data created by the inference unit 22. In an example explained below, abnormality of a product is the phenomenon A shown in FIG. 3 and the specifying data created are four data, namely, "component deviation is large", "solder viscosity is small", "a mask indentation amount is large", and "a printing height is small".

The inference unit 22 searches for specifying data coinciding with the four specifying data in the inference data and acquires specifying data coinciding with the four specifying data as coincident data. In the inference data of the relation shown in FIG. 3, the inference unit 22 acquires all the specifying data, "component deviation is large", "solder viscosity is small", "a mask indentation amount is large", and "a printing height is small" as the coincident data.

Moreover, concerning the respective four incident data, the inference unit 22 specifies high order phenomena and low order phenomena. First, concerning the coincident data "component deviation is large", the inference unit 22 specifies a high order phenomenon A and a low order phenomenon C. Concerning the coincident data "solder viscosity is small", the inference unit 22 specifies a high order phenomenon D and a low order phenomenon G. Moreover, concerning the coincident data "a mask indentation amount is large", the inference unit 22 specifies a high order phenomenon F and a low order phenomenon I. Concerning the coincident data "a printing height is small", the inference unit 22 specifies a high order phenomenon C and a low order phenomenon F.

Figure 5:
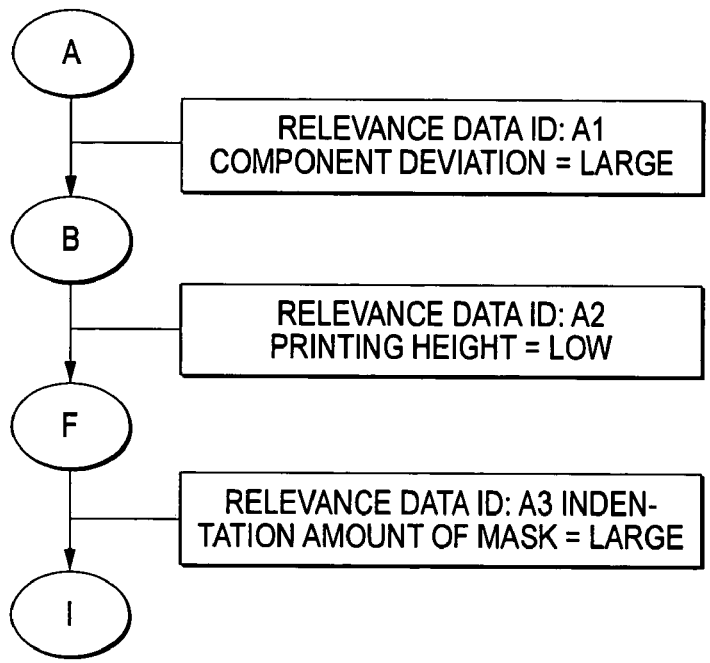
FIG. 5 is a diagram showing a process of the inference.

The inference unit 22 infers, from abnormality (the phenomenon A), a phenomenon forming a fundamental cause of the abnormality using the specified four combinations of high order phenomena and low order phenomena, that is, a relation of "high order phenomenon, low order phenomenon)=(A, C), (D, G), (F, I), and (C, F). In this case, the inference unit 22 judges, from the relation, that the low order phenomenon of A is C, the low order phenomenon of C is F, and the low order phenomenon of F is I and infers that the phenomenon (cause) I is a fundamental cause of the abnormality. FIG. 5 is a diagram showing a process of the inference using the phenomena and arrows.

When there are plural low order phenomena of a certain phenomena in this way, the inference unit 22 selectively specifies one phenomenon out of the low order phenomena.

As described above, when abnormality occurs in a product manufactured by the manufacturing equipment 2 and the abnormality is caused by stepwise accumulation of plural causes (phenomena), the inference unit 22 infers a fundamental cause of the abnormality by specifying, using at least the inference data stored in advance, the causes (phenomena) stepwise and, at least at certain one stage, selectively specifying one cause (phenomenon) out of two or more direct causes (phenomena) that cause a cause (phenomenon) at the stage.

When it is assumed that the causes specified stepwise leading from the direct cause (phenomenon) of the abnormality to the inferred fundamental cause in this order are a first cause, a second cause, . . . , and an nth cause (n is a natural number equal to or larger than 2), in the example described above, n is 3 and the first cause corresponds to the phenomenon C, the second cause corresponds to the phenomenon F, and the third cause corresponds to the phenomenon I.

When a reason why the abnormality occurs from the first cause is a first reason and a reason why the ith cause occurs from the i+1th cause is an i+1th reason (i is a natural number equal to or larger than 1 and equal to or smaller than n−1), in the example described above, the first reason corresponds to a reason indicated by reason explanation information, reason image address information, related equipment component information, and related inspection information associated with the relevance data ID A1. The second reason corresponds to a reason indicated by reason explanation information, reason image address information, related equipment component information, and related inspection information associated with the relevance ID A2. The third reason corresponds to a reason indicated by reason explanation information, reason image address information, related equipment component information, and related inspection information associated with the relevance data ID A3. Moreover, the first cause and the abnormality are related causes concerning the first reason and the i+1th cause and the ith cause are related causes concerning the i+1th reason.

Figure 6:
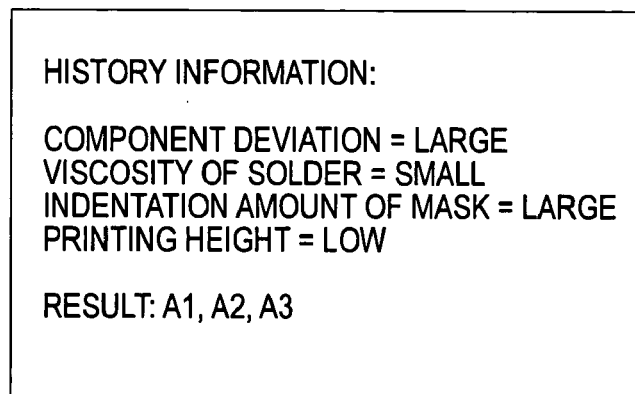
FIG. 6 is a diagram showing an inference history in the inference.

As shown in FIG. 6, the inference unit 22 leaves the respective specifying data created by the inference unit 22 in the storing unit 13 collectively as history information.

As described above, in the inference data, the conditional expression data and the relevance data IDs are associated. The specifying data is data forming the conditional expression data. Thus, the inference unit 22 acquires, using this relation, relevance data IDs associated with specifying data identical with the coincidence data in the inference data. Specifically, in the case of FIG. 3, the inference unit 22 acquires the relevance data IDs A1, A2, and A3.

As shown in FIG. 6, the inference unit 22 leaves the relevance IDs acquired as the history information. When the series of inference processing ends, the inference unit 22 sends information indicating that the inference processing has ended to the reason acquiring unit 23.

The reason explanation information, the reason image address information, the related equipment component information, and the related inspection information associated with the relevance data ID A1 correspond to data concerning a first reason described in claims. Similarly, the reason explanation information, the reason image address information, the related equipment component information, and the related inspection information associated with the relevance data ID A2 correspond to data concerning a second reason described in claims. The reason explanation information, the reason image address information, the related equipment component information, and the related inspection information associated with the relevance data ID A3 correspond to data concerning a third reason described in claims.

The reason acquiring unit 23 will be explained.

When the reason acquiring unit 23 receives the information from the inference unit 22, the reason acquiring unit 23 reads out the history information from the storing unit 13. The reason acquiring unit 23 acquires relevance data IDs from the history information. Moreover, the reason acquiring unit 23 acquires, from the inference data stored in the storing unit 13, information on high order phenomena and low order phenomena specified by the relevance data IDs acquired.

The reason acquiring unit 23 acquires, from the reason data stored in the storing unit 13, reason explanation information, reason image address information, related equipment component information, and related inspection information associated with the relevance data IDs acquired for each of the relevance data IDs. The reason acquiring unit 23 acquires, from the storing unit 13, reason explanation image data indicated by the reason image address information acquired for each of the relevance data IDs.

The reason acquiring unit 23 acquires, from the storing unit 13, numerical value data (setting values, measurement values, etc.) for respective items of related equipment component information in the state data. Specifically, the reason acquiring unit 23 acquires numerical value data for an item "mask indentation amount", numerical value data for an item "substrate thickness setting of a printing machine", numerical value data for an item "component mounting ratio", numerical value data for an item "mask recognition ratio", numerical value data for "component recognition ratio", and the like.

The reason acquiring unit 23 acquires data concerning inspection items (inspection result data) from the storing unit 13. Specifically, the reason acquiring unit 23 acquires numerical value data for an item "printing area", numerical value data for an item "component deviation", and the like. The reason acquiring unit 23 also acquires reference value data (threshold value data) in the respective inspection items from the storing unit 13.

Moreover, the reason acquiring unit 23 acquires, from the storing unit 13, inspection point state image data related to the inspection result data acquired.

The reason acquiring unit 23 sends, for each of the relevance data IDs acquired, reason explanation information, reason explanation image data, related equipment component information, related inspection information, numerical value data for the respective items of related equipment component information, numerical value data for respective inspection items of the related inspection information, inspection point state image data, the reference value, information on high order phenomena, information on low order phenomena, specifying data in conditional expression data associated with the relevance data ID, and inspection result data used in creating the specifying data to the display control unit 24. The reason acquiring unit 23 reads out the specifying data from the storing unit 13 and, then, sends the specifying data to the display control unit 24.

The display control unit 24 will be explained.

The display control unit 24 receives, for each of the relevance data IDs, the reason explanation information, the reason explanation image data, the related equipment component information, the related inspection information, the numerical value data for the respective items of related equipment component information, the numerical value data for respective inspection items of the related inspection information, the inspection point state image data, the reference value, the information on high order phenomena, the information on low order phenomena, the specifying data in conditional expression data associated with the relevance data ID, and the inspection result data used in creating the specifying data from the reason acquiring unit 23. The display control unit 24 displays information on the display unit 14 on the basis of the information received. Content displayed on a display screen of the display unit 14 will be explained.

Figure 7:
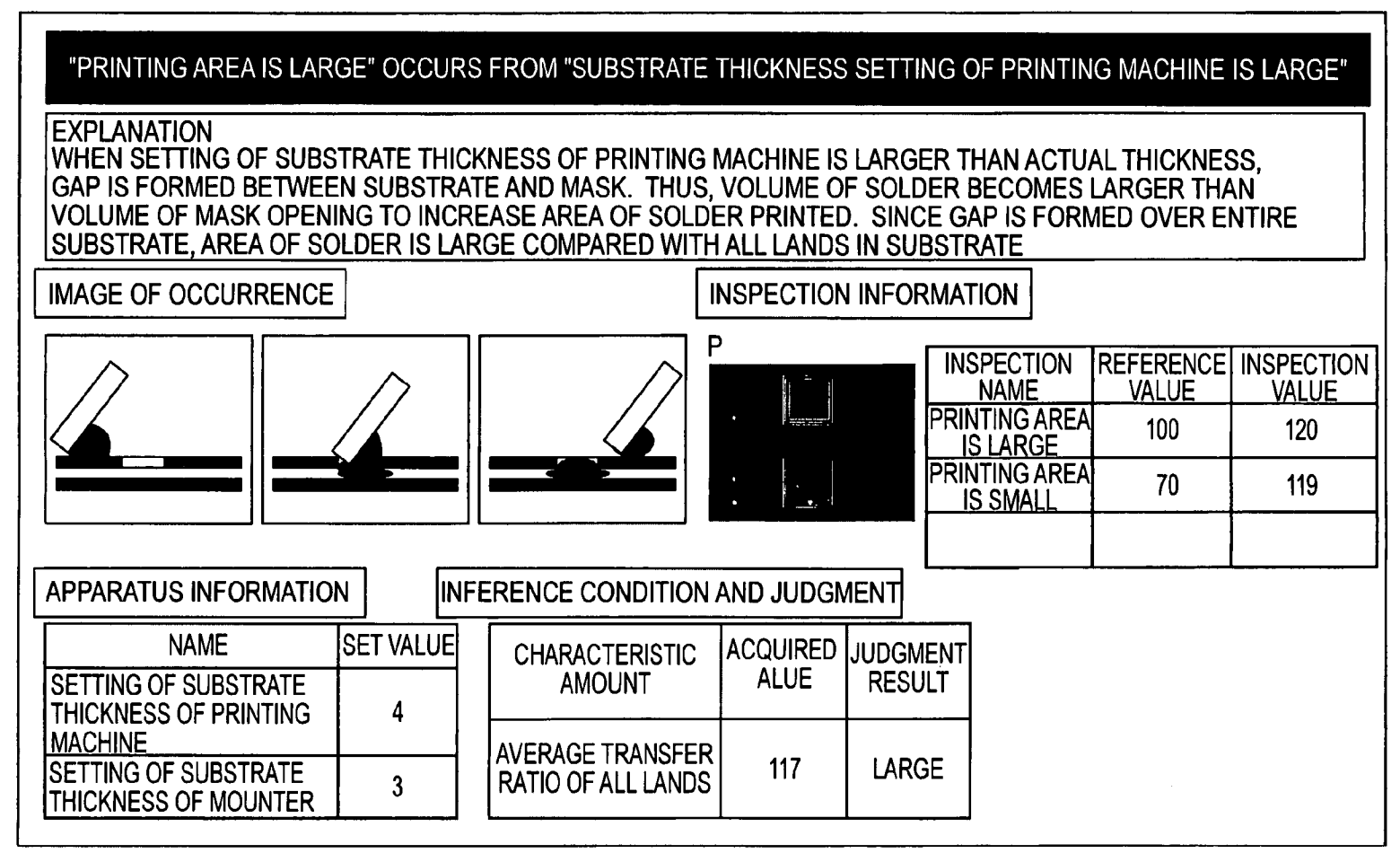

The display control unit 24 causes the display unit 14 to display a screen for each of the relevance data IDs. FIG. 7 is an example of the screen. As shown in the figure, the display control unit 24 causes the display unit 14 to display, for example, information "'a printing area is large' occurs from 'substrate thickness setting of a printing machine is large'" (hereinafter, title information) using the information on high order phenomena and the information on low order phenomena. "Substrate thickness setting of a printing machine is large" corresponds to a low order phenomenon and "a printing area is large" corresponds to a high order phenomenon.

The display control unit 24 causes the display unit 14 to display the reason explanation information in an item of explanation in the figure. The display control unit 24 causes the display unit 14 to display the reason explanation image data in an item of image of occurrence in the figure. In the case of the figure, the reason explanation image data includes three image data (image data before a squeegee passes an opening of a mask, image data during the passage, and image data after the passage).

As shown in the figure, the display control unit 24 causes the display unit 14 to display the related equipment component information and the numerical data for items of the related equipment component information in an item of apparatus information in the figure. In the figure, "substrate thickness setting of a printing machine" and "substrate thickness setting of a mounter" correspond to the related equipment component information and "3" and "4" correspond to the numerical value data.

As shown in the figure, the display control unit 24 causes the display unit 14 to display the inspection point state image data in a section of inspection information in the figure. In an example in the figure, an image obtained by photographing a printing state of solder is displayed. As shown in the figure, the display control unit 24 causes the display 14 to display the related inspection information, the reference value of inspection in the related inspection information, and the numerical value data for respective inspection item of the related inspection information in an item of inspection information in the figure. In the figure, "printing area" corresponds to the related inspection information, "100" corresponds to the reference value, and "120" corresponds to the numerical value data (an inspection value).

As shown in the figure, the display control unit 24 causes the specifying data in conditional expression data associated with the relevance data ID and the inspection result data used in creating the specifying data in an item of inference condition and judgment. In the figure, the specifying data is divided into "average transfer ratio of all lands" and "large", which are displayed in sections of a characteristic amount and a judgment result, respectively. Inspection result data "117" is displayed in a section of an acquired value.

When the operation unit 11 receives a predetermined instruction from the user, the display control unit 24 switches a display screen in order for each of the relevance data IDs. For example, in the case of the relevance data IDs described in the history information, the display control unit 24 switches the display screen in an order of A3, A2, and A1.

In this case, a display screen having title information "a phenomenon F occurs from a phenomenon I" is displayed. Then, a display screen having title information "a phenomenon C occurs from a phenomenon F" is displayed. Finally, a display screen having title information "a phenomenon A occurs from a phenomenon C" is displayed.

The switching of a display screen is not limited to the method described above. A display screen complying with an instruction of the user may be displayed. An order of display is not specifically limited. However, it is preferable to display respective display screens in an order from a fundamental cause (phenomenon) to abnormality (phenomenon) such as an order of A3, A2, and A1.

In this way, the display control unit 24 causes the display unit 14 to display the data concerning the first reason to the nth reason for each of the reasons in association with related causes concerning the respective reasons.

As described above, when it is assumed that n is a natural number equal to or larger than 2, i is an arbitrary natural number equal to or larger than 1 and equal to or smaller than n−1, the causes specified stepwise leading from the direct cause of the abnormality to the inferred fundamental cause are a first cause, a second cause, . . . , and an nth cause, a reason why the abnormality occurs from the first cause is a first reason and a reason why the ith cause occurs from the i+1th cause is an i+1th reason, data indicating, for each of certain causes at a certain stage, reasons why the certain causes occur from direct causes that cause the causes is reason data, the first cause and the abnormality are related causes concerning the first reason, and the i+1th cause and the ith cause are related causes concerning the i+1th reason, it can be said that the information processing apparatus 4 has the following constitution.

It can be said that the information processing apparatus 4 includes: the inference unit (inferring means) 22 that infers, when abnormality occurs in a product manufactured by manufacturing equipment and the abnormality is caused by stepwise accumulation of plural causes, a fundamental cause of the abnormality by specifying the causes stepwise and, at least at certain one stage, selectively specifying one cause out of two or more direct causes that cause a cause at the stage using at least inference data stored in advance; the reason acquiring unit (reason data acquiring means) 23 that acquires, when the inferring unit 22 infers the fundamental cause, data concerning the first reason to the nth reason in the reason data from the storing unit 13 having the reason data stored therein; and the display control unit (display control means) 24 that causes the display unit 14 to display, for each of the reasons, the data concerning the first reason to the nth reason acquired in association with the related causes concerning the respective reasons.

Consequently, when abnormality occurs in a product manufactured by manufacturing equipment and the abnormality is caused by stepwise accumulation of plural causes, it is possible to infer a fundamental cause of the abnormality by specifying, with the inference unit 22, the causes stepwise and, at least at certain one stage, selectively specifying one cause out of two or more direct causes that cause a cause at the stage using at least inference data stored in advance.

When the inference unit 22 infers the fundamental cause, it is possible to acquire, with the reason acquiring unit 23, the data concerning the first reason to the nth reason in the reason data from the storage device having the reason data stored therein.

In other words, it is possible to acquire, from the reason data, concerning the respective causes (including the fundamental cause) specified by the inference unit 22 leading from the abnormality to the fundamental cause, with the reason acquiring unit 23, data indicating a reason why a cause at a stage close to the abnormality from this cause by one stage of the cause occurs. In addition, it is possible to acquire, from the reason data, with the reason acquiring unit 23, data indicating a reason why the abnormality occurs from a direct cause of the abnormality, which is the cause specified.

Moreover, it is possible to cause, with the display control unit 24, the display unit 14 to display, for each of the reasons, the data concerning the first reason to the nth reason acquired in association with the related causes concerning the respective reasons.

In other words, it is possible to cause, concerning the respective causes specified by the inference unit 22, with the display control unit 24, the display unit 14 to display, for each of the reasons, the data indicating a reason why a cause at a stage close to the abnormality from this cause by one stage of the cause occurs and the data indicating a reason why the abnormality occurs from a direct cause of the abnormality, which is the cause specified, in association with the related causes concerning the respective reasons.

This makes it possible for the user to grasp, concerning the respective causes specified in the process of inference by the inference unit 22, a reason why a cause at a stage close to the abnormality from this cause by one stage of the cause and a reason why the abnormality occurs from a direct cause of the abnormality, which is the cause specified, together with the related causes concerning the respective reasons by checking content of display on the display unit 14.

Accordingly, the user can grasp what kinds of causes are accumulated stepwise to cause the abnormality and a causal relation between a certain cause at a certain stage and a direct cause of the cause (i.e., a reason why a certain cause (including abnormality) at a certain stage occurs from the direct cause).

Therefore, it is possible to provide an information processing apparatus that allows the user to understand what kinds of causes are accumulated stepwise in what kind of order to cause abnormality and due to what kinds of reasons respective causes occur from direct causes of the respective causes.

Assuming that the data concerning the first reason to the nth reason acquired are first data, second data, . . . , and nth data, respectively, it can be said that the display control unit 24 of the information processing apparatus 4 causes the display unit 14 to display the data concerning the first reason to the nth reason in an order of the nth data, the n−1th data, . . . , and the first data.

Consequently, the display control unit 24 causes the display unit 14 to display the data concerning the first reason to the nth reason in an order of the nth data, the n−1th data, . . . , and the first data. This makes it possible for the user to check the reasons in the order of the nth reason, the n−1th reason, . . . , and the first reason on the display unit 14. Accordingly, the user can grasp the respective reasons in an order leading from the fundamental cause to the abnormality. Therefore, the user can understand the reasons in a course in which the abnormality occurs from the fundamental cause in accordance with the course.

It can be said that, in the information processing apparatus 4, the respective reason explanation image data are stored in the storing unit 13 as the reason data and the display control unit 24 causes, in displaying the data concerning the first reason to the nth reason acquired, the display device 14 to display the reason explanation image data corresponding to the respective reasons.

Consequently, in displaying the data concerning the first reason to the nth reason acquired, it is possible to cause, with the display control unit 24, the display unit 14 to display the reason explanation image data corresponding to the respective reasons. Accordingly, the user can check the respective reasons together with the images. Therefore, the user can easily understand the reasons in a course in which the abnormality occurs from the fundamental cause compared with the case without images.

It can be said that the information processing apparatus 4 further includes the data acquiring unit (inspection result data acquiring means) 21 that acquires at least inspection result data indicating the respective causes, the first cause to the nth cause, from an inspection apparatus 3 that inspects a quality of the product and the display control unit 24 causes the display unit 14 to display, in displaying data concerning the i+1th reason, inspection result data indicating the ith cause and, in displaying data concerning the first reason, inspection result data indicating the abnormality.

Consequently, it is possible to acquire, with the data acquiring unit 21, at least inspection result data indicating the respective causes, the first cause to the nth cause, from the inspection apparatus 3 that inspects a quality of the product.

When the display control unit 24 causes the display unit 14 to display the data concerning the i+1th reason, the display control unit 24 causes the display unit 14 to display the inspection result data indicating the ith cause. Accordingly, in causing the display unit 14 to display the data concerning the i+1th reason, it is possible to cause the display unit 14 to display the inspection result data indicating the ith cause that is a cause caused by the i+1th reason.

When the display control unit 24 causes the display unit 14 to display the data concerning the first reason, the display control unit 24 causes the display unit 14 to display the inspection result data indicating the abnormality. Accordingly, in causing the display unit 14 to display the data concerning the first reason, it is possible to cause the display unit 14 to display the inspection result data indicating the abnormality that is a cause caused by the i+1th reason.

Therefore, the user can check, concerning the respective reasons, data indicating causes (including the abnormality) that support the reasons and are caused by the reasons.

It can be said that the data acquiring unit (inspection result data acquiring means) 21 further acquires, as the inspection result data, inspection point state image data and the display control unit 24 causes the display unit 14 to display, in displaying data concerning the i+1th reason, inspection point state image data indicating the ith cause and, in displaying data concerning the first reason, inspection point state image data indicating the abnormality.

Consequently, it is possible to acquire, with the data acquiring unit 21, as the inspection result data, inspection point state image data that is photographed by a photographing device and indicates a state of an inspection point in the inspection at the time when the inspection result data is acquired.

When the display control unit 24 causes the display unit 14 to display the data concerning the i+1th reason, the display control unit 24 causes the display unit 14 to display the inspection point state image data indicating the ith cause. Accordingly, in causing the display unit 14 to display the data concerning the i+1th reason, it is possible to cause the display unit 14 to display the inspection point state image data indicating the ith cause, which is a cause caused by the i+1th reason, as an actual inspection image.

When the display control unit 24 causes the display unit 14 to display the data concerning the first reason, the display control unit 24 causes the display unit 14 to display the inspection point state image data indicating the abnormality. Accordingly, in causing the display unit 14 to display the data concerning the first reason, it is possible to cause the display unit 14 to display the inspection point state image data indicating the abnormality, which is a cause caused by the first reason, as an actual inspection image.

Therefore, the user can check, concerning the respective reasons, data indicating causes (including the abnormality), which support the reasons and are caused by the reasons, as an image.

It can be said that the information processing apparatus 4 further includes the data acquiring unit (state data acquiring means) 21 that acquires the state data from the manufacturing equipment 2 and the display control unit 24 causes the display unit 14 to display, in displaying data concerning the i+1th reason, state data of the equipment components related to the i+1th reason and, in displaying data concerning the first reason, state data of the equipment components related to the first reason.

Consequently, it is possible to acquire, with the data acquiring unit 21, setting values of the respective equipment components and/or state data indicating results of processing applied to the product by the equipment components.

When the display control unit 24 causes the display unit 14 to display the data concerning the i+1th reason, the display control unit 24 causes the display unit 14 to display state data of the equipment components related to the i+1th reason. Moreover, when the display control unit 24 causes the display unit 14 to display the data concerning the first reason, the display control unit 24 causes the display unit 14 to display the state data of the equipment components related to the first reason.

Accordingly, the user can check, for each of the reasons, state data of equipment components related to the respective reasons. Therefore, the user can check, concerning the respective reasons, actual setting values of the equipment components and/or the processing result that support the reasons.

In the above explanation, the inference unit 22 creates, on the basis of the inspection result data and the reference value data, specifying data that can be obtained from the inspection result data and the reference value data and creates, on the basis of the state data, specifying data that can be obtained from the state data. However, the invention is not limited to this.

For example, it is also possible that the inference unit 22 does not create the specifying data and the user inputs specifying data to the inference unit 22 of the control unit 12 via the operation unit 11. Alternatively, it is also possible that the inference unit 22 creates the specifying data and the user inputs specifying data to the inference unit 22 via the operation unit 11.

In the example explained above, the inspection apparatus 3 sends the inspection result data and the reference value data to the information processing apparatus 4. However, the invention is not limited to this. For example, when the inspection apparatus 3 has a function of creating specifying data, the inspection apparatus 3 may send the specifying data itself to the information processing apparatus 4.

The product may be an intermediate product manufactured in an intermediate process of a manufacturing line.

A method of inference in the inference unit 22 is not limited to the example described above. For example, referring to FIG. 3, first, the display control unit 24 causes the display unit 14 to display an indication inquiring the user whether component deviation is large or small and causes the user to select large or small of the component deviation.

For example, when the user selects large of the component deviation, the display control unit 24 causes the display unit 14 to display an indication inquiring the user whether a printing height is low or high and causes the user to select high or low of the printing height.

For example, when the user selects low of the printing height, the display control unit 24 causes the display unit 14 to display an indication inquiring the user whether a mask indentation amount is large or small and causes the user to select large or small of the mask indentation amount.

For example, when the user selects large of the mask indentation amount, the inference unit 22 infers that a fundamental cause of the abnormality is the phenomenon I.

An inference method performed by the inference unit 22 may be such a method. In the above description, the display control unit 24 causes the user to make selection. However, selection by the user is unnecessary as long as a cause of abnormality is specified in the information processing apparatus 4.

Figure 8:
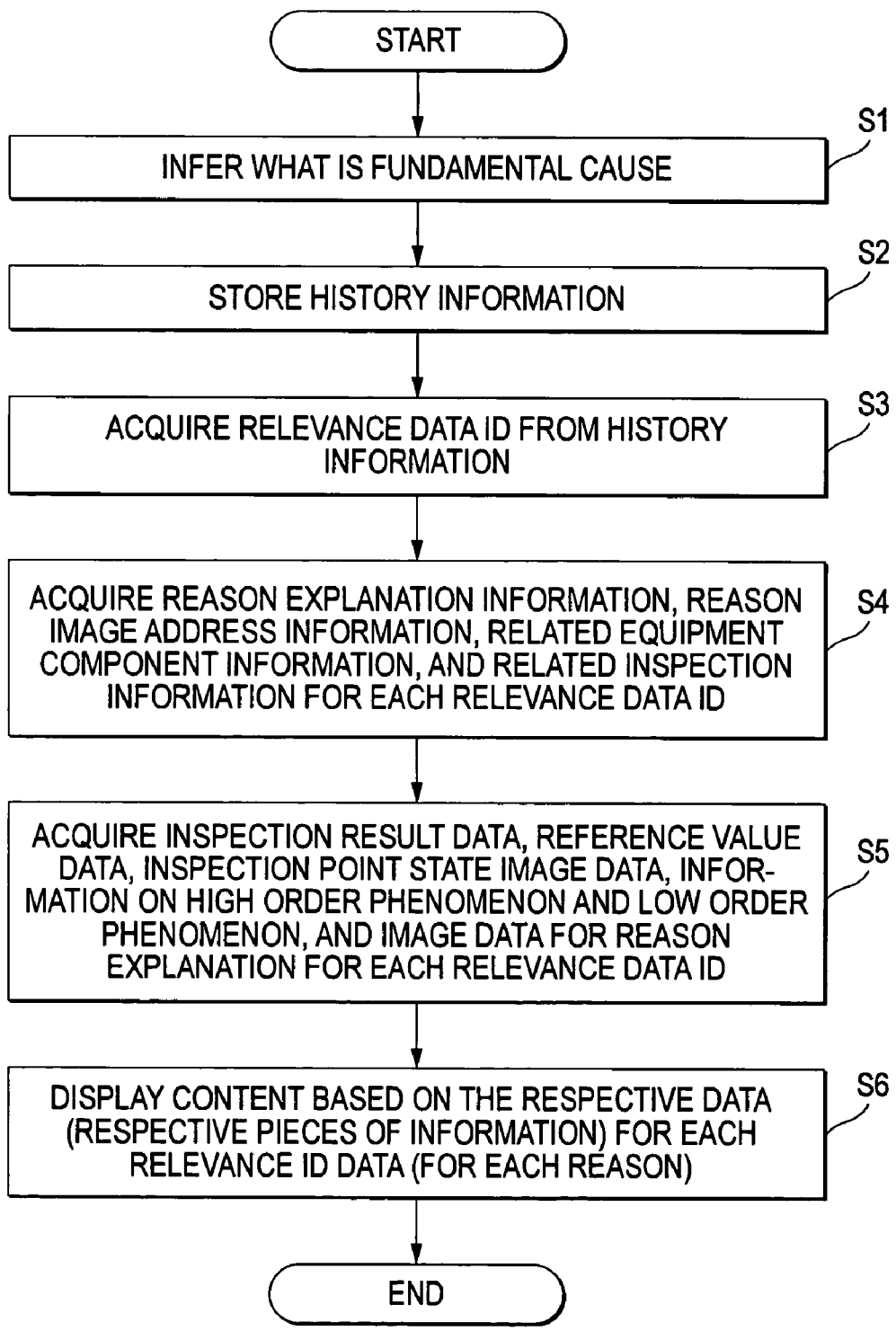
FIG. 8 is a flowchart showing a flow of processing in the information processing apparatus.

A flow of processing performed in the information processing apparatus 4 will be explained with reference to FIG. 8.

First, the inference unit 22 infers a fundamental cause of abnormality (S1). After S1, the inference unit 22 stores specifying data identical with the coincident data and relevance data IDs associated with the specifying data in the storing unit 13 as history information (S2). After S2, the reason acquiring unit 23 acquires the relevance data IDs stored as the history information from the storing unit 13 (S3).

After S3, the reason acquiring unit 23 acquires, from the storing unit 13, for each of the relevance data IDs, reason explanation information, reason image address information, related equipment component information, and related inspection information associated with the relevance data IDs acquired (S4).

After S4, the reason acquiring unit 23 acquires, from the storing unit 13, for each of the relevance data IDs, data concerning inspection items (inspection result data), reference value data in the respective inspection items, inspection point state image data related to the inspection result data acquired, information on high order phenomena and low order phenomena specified by the relevance data IDs acquired, and reason explanation image data of an address indicated by the reason image address information acquired (S5).

After S5, the display control unit 24 causes the display unit 14 to display, for each of the relevance data IDs (for each reason), content based on the respective data acquired from the storing unit 13 by the reason acquiring unit 23 (S6). The series of processing ends.

Lastly, the respective blocks of the control unit 12 of the information processing apparatus 4 may be constituted by a hardware logic or may be realized by software using a CPU as described below.

The information processing apparatus 4 includes a Central Processing Unit (CPU) that executes commands of a control program for realizing the respective functions, a Read Only Memory (ROM) having the control program stored therein, a Random Access Memory (ROM) that develops the control program, and a storage device (a recording medium) such as a memory that stores the control program and various data. It is also possible to attain the object of the invention when a recording medium having recorded therein program codes (an execution form program, an intermediate code program, and a source program) of the control program of the information processing apparatus 4, which is software for realizing the functions described above, in a form readable by a computer is supplied to the information processing apparatus 4 and the computer (or a CPU or an MPU) reads out and executes the program codes recorded in the recording medium.

As the recording medium, it is possible to use, for example, tapes such as a magnetic tape and a cassette tape, disks including magnetic disks such as a floppy (registered trademark) disk and a hard disk and optical disks such as a CD-ROM, an MO, an MD, a DVD, and a CD-R, cards such as an IC card (including a memory card) and an optical card, or semiconductor memories such as a mask ROM, an EPROM, an EEPROM, and a flash ROM.

The information processing apparatus 4 may be constituted to be connectable to a communication network to supply the program codes via the communication network. The communication network is not specifically limited. It is possible to use, for example, the Internet, an intranet, an extranet, a LAN, an ISDN, a VAN, a CATV communication network, a virtual private network, a telephone line network, a mobile communication network, a satellite communication network, and the like. A transmission medium constituting the communication network is not specifically limited. It is possible to use, for example, wire transmission media such as the IEEE1394, the USB, a power-line carrier, a cable TV line, a telephone line, and an ADSL line and wireless transmission media such as an infrared ray media like the IrDA or a remote controller, Bluetooth (registered trademark), the 802.11 radio, the HDR, a cellular phone network, a satellite link, and a ground wave digital network. The invention can also be realized in a form of a computer data signal embedded in a carrier wave in which the program code is embodied by electronic transmission.

The invention is applicable to various apparatuses that infer a fundamental cause from abnormality of a product.

As described above the information processing apparatus includes: inferring means for inferring, when abnormality occurs in a product manufactured by manufacturing equipment and the abnormality is caused by stepwise accumulation of plural causes, a fundamental cause of the abnormality by specifying the causes stepwise and, at least at certain one stage, selectively specifying one cause out of two or more direct causes that cause a cause at the stage using at least inference data stored in advance; reason data acquiring means for acquiring, assuming that n is a natural number equal to or larger than 2, i is an arbitrary natural number equal to or larger than 1 and equal to or smaller than n−1, the causes specified stepwise leading from the direct cause of the abnormality to the inferred fundamental cause are a first cause, a second cause, . . . , and an nth cause, a reason why the abnormality occurs from the first cause is a first reason and a reason why the ith cause occurs from the i+1th cause is an i+1th reason, data indicating, for each of certain causes at a certain stage, reasons why the certain causes occur from direct causes that cause the causes is reason data, the first cause and the abnormality are related causes concerning the first reason, and the i+1th cause and the ith cause are related causes concerning the i+1th reason, when the inferring means infers the fundamental cause, data concerning the first reason to the nth reason in the reason data from a storage device having the reason data stored therein; and display control means for causing a display device to display, for each of the reasons, the data concerning the first reason to the nth reason acquired in association with the related causes concerning the respective reasons.

Therefore, there is an advantage that it is possible to provide an information processing apparatus that allows a user to understand what kinds of causes are accumulated stepwise in what kind of order to cause abnormality and due to what kinds of reasons respective causes occur from direct causes of the respective causes.

As described above, the information processing method includes: an inferring step of inferring, with inferring means, when abnormality occurs in a product manufactured by manufacturing equipment and the abnormality is caused by stepwise accumulation of plural causes, a fundamental cause of the abnormality by specifying the causes stepwise and, at least at certain one stage, selectively specifying one cause out of two or more direct causes that cause a cause at the stage using at least inference data stored in advance; an acquiring step of acquiring, with reason data acquiring means, assuming that n is a natural number equal to or larger than 2, i is an arbitrary natural number equal to or larger than 1 and equal to or smaller than n−1, the causes specified stepwise leading from the direct cause of the abnormality to the inferred fundamental cause are a first cause, a second cause, . . . , and an nth cause, a reason why the abnormality occurs from the first cause is a first reason and a reason why the ith cause occurs from the i+1th cause is an i+1th reason, data indicating, for each of certain causes at a certain stage, reasons why the certain causes occur from direct causes that cause the causes is reason data, the first cause and the abnormality are related causes concerning the first reason, and the i+1th cause and the ith cause are related causes concerning the i+1th reason, when the inferring means infers the fundamental cause, data concerning the first reason to the nth reason in the reason data from a storage device having the reason data stored therein; and a display step of causing, with display control means, a display device to display, for each of the reasons, the data concerning the first reason to the nth reason acquired in association with the related causes concerning the respective reasons.

Therefore, there is an advantage that it is possible to provide an information processing apparatus that allows a user to understand what kinds of causes are accumulated stepwise in what kind of order to cause abnormality and due to what kinds of reasons respective causes occur from direct causes of the respective causes.

As described above, the program is a program for causing a computer to function as the respective means of the information processing apparatus.

Therefore, there is an advantage that it is possible to provide a user with the information processing apparatus by loading the program to a computer system.

As described above, the recording medium is a computer readable recording medium having the program recorded therein.

Therefore, there is an advantage that it is possible to provide a user with the information processing apparatus by loading the program recorded in the recording medium to a computer system.

The invention is not limited to the embodiment described above. Various modifications of the invention are possible within the scope described in claims. In other words, embodiments obtained by combining the technical means appropriately modified within the scope described in claims are also included in the technical scope of the invention.

What is claimed is:

1. An information processing apparatus comprising:
   a display device;
   a storage device;
   inferring means for inferring, when abnormality occurs in a product manufactured by manufacturing equipment and the abnormality is caused by stepwise accumulation of plural causes, a fundamental cause of the abnormality by specifying the causes stepwise and, at least at certain one stage, selectively specifying one cause out of two or more direct causes that cause a cause at the stage using at least inference data stored in the storage device in advance;
   reason data acquiring means for acquiring, assuming that n is a natural number equal to or larger than 2, i is an arbitrary natural number equal to or larger than 1 and equal to or smaller than n−1, the causes specified stepwise leading from the direct cause of the abnormality to the inferred fundamental cause are first to nth causes, a reason why the abnormality occurs from the first cause is a first reason and a reason why the ith cause occurs from the i+1th cause is an i+1th reason, data indicating, for each of certain causes at a certain stage, reasons why the certain causes occur from direct causes that cause the causes is reason data, the first cause and the abnormality are related causes concerning the first reason, and the i+1th cause and the ith cause are related causes concerning the i+1th reason, when the inferring means infers the fundamental cause, data concerning the first reason to the nth reason in the reason data from the storage device having the reason data stored therein; and
   display control means for causing the display device to display, for each of the reasons, the data concerning the first reason to the nth reason acquired in association with the related causes concerning the respective reasons.

2. An information processing apparatus according to claim 1, wherein, assuming that the data concerning the first reason to the nth reason acquired are first to nth data respectively, the display control means causes the display device to display the data concerning the first reason to the nth reason in an order of the nth data to the first data.

3. An information processing apparatus according to claim 2, wherein
   assuming that image data for explaining the respective reasons with images are reason explanation image data, respectively, the respective reason explanation image data are stored in the storage device as the reason data, and
   the display control means causes, in displaying the data concerning the first reason to the nth reason acquired, the display device to display the reason explanation image data corresponding to the respective reasons.

4. An information processing apparatus according to claim 1, further comprising inspection result data acquiring means for acquiring at least inspection result data indicating the respective causes, the first cause to the nth cause, from an inspection apparatus that inspects a quality of the product, wherein
   the display control means causes the display device to display, in displaying data concerning the i+1th reason, inspection result data indicating the ith cause and, in displaying data concerning the first reason, inspection result data indicating the abnormality.

5. An information processing apparatus according to claim 4, wherein
   the inspection result data acquiring means further acquires, as the inspection result data, inspection point state image data that is photographed by a photographing device and indicates a state of an inspection point in the inspection at the time when the inspection result data is acquired, and
   the display control means causes the display device to display, in displaying data concerning the i+1th reason, inspection point state image data indicating the ith cause and, in displaying data concerning the first reason, inspection point state image data indicating the abnormality.

6. An information processing apparatus according to claim 1, further comprising state data acquiring means for acquiring, assuming that components constituting the manufacturing equipment and affecting a quality of a product manufactured by the manufacturing equipment are equipment components and data indicating setting values of the respective equipment components and/or results of processing applied to the product by the equipment components is state data, the state data from the manufacturing equipment, wherein the display control means causes the display device to display, in displaying data concerning the i+1th reason, state data of the equipment components related to the i+1th reason and, in displaying data concerning the first reason, state data of the equipment components related to the first reason.

7. An information processing method comprising:

an inferring step of inferring, when abnormality occurs in a product manufactured by manufacturing equipment and the abnormality is caused by stepwise accumulation of plural causes, a fundamental cause of the abnormality by specifying the causes stepwise and, at least at certain one stage, selectively specifying one cause out of two or more direct causes that cause a cause at the stage using at least inference data stored in advance;

an acquiring step of acquiring, assuming that n is a natural number equal to or larger than 2, i is an arbitrary natural number equal to or larger than 1 and equal to or smaller than n−1, the causes specified stepwise leading from the direct cause of the abnormality to the inferred fundamental cause are first to nth causes, a reason why the abnormality occurs from the first cause is a first reason and a reason why the ith cause occurs from the i+1th cause is an i+1th reason, data indicating, for each of certain causes at a certain stage, reasons why the certain causes occur from direct causes that cause the causes is reason data, the first cause and the abnormality are related causes concerning the first reason, and the i+1th cause and the ith cause are related causes concerning the i+1th reason, when the inferring step infers the fundamental cause, data concerning the first reason to the nth reason in the reason data from a storage device having the reason data stored therein; and a display step of causing, a display device to display, for each of the reasons, the data concerning the first reason to the nth reason acquired in association with the related causes concerning the respective reasons.

8. A program product for inferring an abnormality, comprising:

a computer readable medium having computer readable program code embodied thereon capable of causing, when executed, a machine to carry out the following method steps:

an inferring step of inferring, when abnormality occurs in a product manufactured by manufacturing equipment and the abnormality is caused by stepwise accumulation of plural causes, a fundamental cause of the abnormality by specifying the causes stepwise and, at least at certain one stage, selectively specifying one cause out of two or more direct causes that cause a cause at the stage using at least inference data stored in advance;

an acquiring step of acquiring, assuming that n is a natural number equal to or larger than 2, i is an arbitrary natural number equal to or larger than 1 and equal to or smaller than n−1, the causes specified stepwise leading from the direct cause of the abnormality to the inferred fundamental cause are first to nth causes, a reason why the abnormality occurs from the first cause is a first reason and a reason why the ith cause occurs from the i+1th cause is an i+1th reason, data indicating, for each of certain causes at a certain stage, reasons why the certain causes occur from direct causes that cause the causes is reason data, the first cause and the abnormality are related causes concerning the first reason, and the i+1th cause and the ith cause are related causes concerning the i+1th reason, when the inferring step infers the fundamental cause, data concerning the first reason to the nth reason in the reason data from a storage device having the reason data stored therein; and a display step of causing, a display device to display, for each of the reasons, the data concerning the first reason to the nth reason acquired in association with the related causes concerning the respective reasons.

9. A program product for inferring an abnormality according to claim 8, wherein, assuming that the data concerning the first reason to the nth reason acquired are first data, second data, . . . , and nth data, respectively, the display step causes the display device to display the data concerning the first reason to the nth reason in an order of the nth data to the first data.

10. A program product for inferring an abnormality according to claim 9, wherein assuming that image data for explaining the respective reasons with images are reason explanation image data, respectively, the respective reason explanation image data are stored in the storage device as the reason data, and the display step causes, in displaying the data concerning the first reason to the nth reason acquired, the display device to display the reason explanation image data corresponding to the respective reasons.

11. A program product for inferring an abnormality according to claim 8, further comprising inspection result data acquiring step for acquiring at least inspection result data indicating the respective causes, the first cause to the nth cause, from an inspection apparatus that inspects a quality of the product, wherein the display step causes the display device to display, in displaying data concerning the i+1th reason, inspection result data indicating the ith cause and, in displaying data concerning the first reason, inspection result data indicating the abnormality.

12. A program product for inferring an abnormality according to claim 11, wherein the inspection result data acquiring step further acquires, as the inspection result data, inspection point state image data that is photographed by a photographing device and indicates a state of an inspection point in the inspection at the time when the inspection result data is acquired, and the display step causes the display device to display, in displaying data concerning the i+1th reason, inspection point state image data indicating the ith cause and, in displaying data concerning the first reason, inspection point state image data indicating the abnormality.

13. A program product for inferring an abnormality according to claim 8, further comprising state data acquiring step for acquiring, assuming that components constituting the manufacturing equipment and affecting a quality of a product manufactured by the manufacturing equipment are equipment components and data indicating setting values of the respective equipment components and/or results of processing applied to the product by the equipment components is state data, the state data from the manufacturing equipment, wherein the display step causes the display device to display, in displaying data concerning the i+1th reason, state data of the equipment components related to the i+1th reason and, in displaying data concerning the first reason, state data of the equipment components related to the first reason.

* * * * *